United States Patent
Kramer et al.

(10) Patent No.: US 8,162,799 B2
(45) Date of Patent: Apr. 24, 2012

(54) PROCEDURE FOR CONTROLLING A HYDRAULIC OR PNEUMATIC TRANSMISSION CONTROL UNIT

(75) Inventors: Rupert Kramer, Friedrichshafen (DE);
Marcus Gansohr, Salem (DE);
Johannes Kemler, Bermatingen (DE);
Franz Bitzer, Friedrichshafen (DE);
Rainer Petzold, Friedrichshafen (DE);
Peter Herter, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 12/632,082

(22) Filed: Dec. 7, 2009

(65) Prior Publication Data

US 2010/0151992 A1   Jun. 17, 2010

(30) Foreign Application Priority Data

Dec. 15, 2008   (DE) .................. 10 2008 054 662

(51) Int. Cl.
*F16H 61/06*   (2006.01)
(52) U.S. Cl. ........................ 477/158; 477/162
(58) Field of Classification Search ................ 477/156, 477/158, 162
See application file for complete search history.

(56) References Cited

U.S. PATENT DOCUMENTS

| | | | | |
|---|---|---|---|---|
| 3,803,843 A | * | 4/1974 | Nyman et al. | 60/445 |
| 4,944,201 A | * | 7/1990 | Iino et al. | 60/431 |
| 4,949,596 A | * | 8/1990 | Iino et al. | 60/431 |
| 5,193,416 A | * | 3/1993 | Kanayama | 74/733.1 |
| 5,575,735 A | * | 11/1996 | Coutant et al. | 475/72 |
| 6,164,068 A | | 12/2000 | Harries | |
| 6,223,763 B1 | | 5/2001 | Meyer et al. | |
| 6,705,175 B1 | | 3/2004 | Klatt | |
| 2009/0101464 A1 | | 4/2009 | Doebele et al. | |

FOREIGN PATENT DOCUMENTS

| | | |
|---|---|---|
| DE | 199 21 301 A1 | 11/1999 |
| DE | 198 34 765 A1 | 2/2000 |
| DE | 198 49 488 A1 | 5/2000 |
| DE | 199 31 973 A1 | 1/2001 |
| DE | 10 2006 014 141 A1 | 10/2007 |
| EP | 0 933 564 A2 | 8/1999 |
| WO | 2005/010409 A1 | 2/2005 |

* cited by examiner

*Primary Examiner* — Ha D. Ho

(74) *Attorney, Agent, or Firm* — Davis & Bujold, P.L.L.C.

(57) ABSTRACT

A method of monitoring a hydraulic or pneumatic transmission control system, which comprises a pressure supply unit with a conduit directing a pressure medium under a supply pressure, and an actuating member for a clutch control element of a friction clutch. The actuating member has a pressure space which can be connected by a clutch control valve to the conduit, and in which the supply pressure is determined by a pressure sensor that can be connected to the conduit. The method includes the steps of determining the supply pressure by the pressure sensor, given that briefly opening the clutch control valve produces a pressure increase and/or a pressure gradient of the control pressure in the pressure space, and the currently existing supply pressure can be calculated from the control pressure, the pressure increase and/or the pressure gradient.

15 Claims, 1 Drawing Sheet

PROCEDURE FOR CONTROLLING A HYDRAULIC OR PNEUMATIC TRANSMISSION CONTROL UNIT

This application claims priority from German patent application serial no. 10 2008 054 662.3 filed Dec. 15, 2008.

FIELD OF THE INVENTION

The invention concerns a method for monitoring a hydraulic or pneumatic transmission control system, which comprises a pressure supply unit having a supply line that carries a pressure medium under a supply pressure, and an actuating member of a clutch control element of a friction clutch, such that the actuating member comprises a pressure space that can be connected to the supply line by means of an associated clutch control valve, and in which the supply pressure is determined by a pressure sensor that can be connected to the supply line by a control valve.

BACKGROUND OF THE INVENTION

A hydraulic or pneumatic transmission control system of an automated gearshift transmission usually comprises a pressure supply unit and an actuating member. In the pressure supply unit, a supply pressure is produced in a supply line and held at a specified level. The actuating member comprises control drives usually made as single-action or dual-action control cylinders, such as a clutch control element and a plurality of transmission control elements, whose pressure spaces can be pressurized as necessary via associated control valves which connect them to the supply line, or emptied or depressurized by connecting them to an unpressurized line that leads to a pressure medium sink. In a hydraulic control system, for example, the oil sump can serve as the pressure medium sink, whereas in a pneumatic control system the exhaust air can be discharged through the unpressurized line to the surroundings.

For example, a typical hydraulic transmission control system of an automated gearshift transmission is described in DE 198 49 488 C2. The pressure supply unit of this known transmission control unit comprises an oil pump that can be driven by an electric motor, by means of which hydraulic oil can be conveyed from an oil sump, through a filter element and a one-way valve, into a supply line. To limit the supply pressure in the supply line, a pressure-limiting valve is connected to the supply line, through which surplus hydraulic oil can flow back to the oil sump. To maintain the supply pressure when the oil pump is switched off, a pressure reservoir connected to the supply line is provided. A pressure sensor is also connected to the supply line to detect the supply pressure.

The actuating member of this known transmission control system comprises, on the one hand, a clutch control element made as a single-action control cylinder that can be controlled by an associated clutch control valve, for disengaging and engaging a friction clutch made as a diaphragm spring clutch. On the other hand, the actuating member comprises a selector control element made as a single-action control cylinder that can be controlled by an associated selector control element valve, and a shift control element made as a dual-action control cylinder that can be controlled by two associated shift control valves.

As a special feature, a cutoff valve that can be controlled by the control pressure of the clutch control element is provided, by virtue of which the selector control and shift control elements can only be actuated when the friction clutch is disengaged. To control the friction clutch, a path sensor, which detects the position of the piston rod of the clutch control element, is provided. If there is a defect in the pressure sensor, the supply pressure can no longer be determined and the transmission control system must then immediately switch over to an emergency operating mode, even though the supply pressure in the supply line may still be sufficiently high to enable normal operation at least for a certain time.

On the other hand, from EP 0 933 564 B1 a transmission control system for an automated gearshift transmission is known, in which the actuating device comprises a selector control element and a shift control element each made as a dual-action control cylinder. In a second embodiment of this transmission control system illustrated in FIG. 9 of the document, a respective associated selector control valve and shift control valve are connected immediately upstream from a pressure space of the selector control element and a pressure space of the shift control element. A common main control valve is connected upstream from the respective other pressure space of the selector control and the shift control and from the selector control valve and the shift control valve, by means of which the distribution line concerned can be connected optionally either to the supply line of the pressure supply unit or to an unpressurized line leading to the oil sump.

To the distribution line is connected a pressure sensor whose pressure signal is used, by actuating the control valve, essentially for controlling the selector control and shift control elements. However, by means of this pressure sensor the supply pressure in the supply line can also be determined when the main control valve is fully open to the supply line and the selector control valve and the shift control valve are each in their closed, null positions.

To avoid the associated functional limitations, in DE 199 21 301 A1 a special design of the main control valve is proposed, with which the pressure sensor, this time connected to a secondary line, is connected to the supply line both in the end position of the main control valve when it is fully open to the supply line, and in its end position when it is fully closed relative to the supply line. This enables the supply pressure to be determined and monitored by the pressure sensor even when the distribution line is depressurized, without the selector control valve and the shift control valve having to be in a particular switch position for this. In the modified embodiment, however, the main control valve is substantially more complex and correspondingly more expensive and prone to malfunction.

SUMMARY OF THE INVENTION

Against this background the purpose of the present invention is to propose a method for monitoring a hydraulic or pneumatic transmission control system of the type mentioned to begin with, with which the supply pressure present in the supply line can be determined by a pressure sensor connected to the supply line without making special design provisions in the transmission control system.

The method according to the invention starts from the recognition that the brief opening of a throttle cross-section that connects a pressure source under a higher source pressure $p_Q$ to a pressure space under a lower, control pressure $P_S$, leads to a pressure increase $\Delta p_S$ in the pressure space and to a pressure gradient $\Delta p_S/\Delta t$ which behave proportionally to the pressure difference $\Delta p = p_Q - p_S$ between the pressure source and the pressure space. This means that the source pressure $P_Q$ present in the pressure source can be calculated from the control pressure $p_S$ and the pressure increase $\Delta p_S$ or the pressure gradient $\Delta p_S/\Delta t$ in the pressure space. This principle for determining a higher source pressure $P_Q$ can in any case be used with any hydraulic or pneumatic control systems in which a pressure sensor separated by a control valve is arranged downstream from the pressure source.

Accordingly, the invention concerns a method for monitoring a hydraulic or pneumatic transmission control system, comprising a pressure supply unit with a supply line carrying a pressure medium under a supply pressure, and with an actuating member of a clutch control element of a friction clutch, such that the actuating member has a pressure space that can be connected to an associated clutch control valve by the supply line, and in which the supply pressure is determined by a pressure sensor that can be connected to the supply line via a control valve.

To achieve the stated objective, it is provided that the supply pressure $p_V$ actually existing in the supply line of the pressure supply unit of a hydraulic or pneumatic transmission control system, is calculated from the control pressure $p_K$ present in the pressure space of the clutch control element and from the pressure increase $\Delta p_K$ and/or the pressure gradient $\Delta p_K/\Delta t$ of the control pressure $p_K$ produced by briefly opening the clutch control valve, the control pressure $p_K$, the pressure increase $\Delta p_K$ and/or the pressure gradient $\Delta p_K/\Delta t$ being determined by a pressure sensor connected to the pressure space of the clutch control element.

The method according to the invention does not require any special design precautious in the pressure supply unit or in the actuating member of the transmission control system, and can be used as an emergency procedure, i.e. if there is a defect in a pressure sensor connected to the supply line, and also as the standard procedure, i.e. to save having to connect a pressure sensor to the supply line.

A corresponding hydraulic or pneumatic clutch control system, which can also be part of a transmission control system, is for example known in two embodiments from DE 10 2006 014 141 A1. However, in the method described therein for controlling an automated friction clutch the pressure sensor connected to the pressure space of the clutch control element is only used for the control of the friction clutch. In this known method it is in essence provided that the coarse control of the friction clutch takes place by path control, i.e. by means of the path signal from a path sensor that detects the position of the piston rod of the clutch control element, whereas the fine control of the friction clutch takes place by pressure control, i.e. by means of the pressure signal from the pressure sensor that detects the control pressure present in the pressure space of the clutch control element.

So that the current operating condition of the friction clutch, i.e. the degree of engagement or the degree of over-pressure of the friction clutch, will not be lastingly changed or affected by the determination according to the invention of the increase of the control pressure $p_K$ of the clutch control element related to the supply pressure $p_V$, it is expedient to provide that at a time close to, i.e. shortly before or shortly after, the opening of the clutch control valve, to determine the supply pressure $p_V$, a drop $\Delta p_K$ of the control pressure $p_K$ is produced by briefly connecting the pressure space of the clutch control element to an unpressurized line, the degree of this pressure drop being approximately the same as the increase $\Delta p_K$ of the control pressure $p_K$ produced by opening the clutch control valve.

In the case of a passively engaging friction clutch such as a diaphragm spring clutch, the supply pressure $p_V$ is preferably determined at the beginning of disengagement of the friction clutch related to a starting or shift process after pre-filling of the clutch control element. Thanks to the prior pre-filling of the pressure space of the clutch control element, contingent errors in the determination of the supply pressure $p_V$ are avoided. In addition, the subsequent pressure increase $\Delta p_K$ for determining the supply pressure $p_V$ does not delay the disengagement process envisaged any further, since the further increase of the control pressure $p_K$ for disengaging the friction clutch can take place immediately thereafter.

While driving, with a passively engaging friction clutch the supply pressure $p_V$ is preferably determined in operating phases with the friction clutch fully engaged, with prior pre-filling and subsequent depressurizing of the clutch control element. In such cases the supply pressure $p_V$ is determined while the friction clutch is engaged with over-pressure, so that the slight increase of the control pressure $p_K$ cannot result in disengagement or slipping of the friction clutch. The prior pre-filling of the clutch control element serves to increase the accuracy of the supply pressure $p_V$ determined, and when the clutch control element is subsequently depressurized the initial condition, with the friction clutch fully engaged, is restored.

With an actively engaging friction clutch such as a disk clutch or disk brake of an automatic transmission, the supply pressure $p_V$ is preferably determined at the end of engagement of the friction clutch related to a starting or shift process before the maximum pressure envisaged for the clutch control element has been reached, i.e. in the over-pressure range, without the starting or shift process concerned being delayed thereby.

While driving, with an actively engaging friction clutch the supply pressure $p_V$ is preferably determined in operating phases with the friction clutch fully engaged, with prior reduction of the pressure of the clutch control element. Thus, the supply pressure is again determined in the over-pressure range, and due to the prior pressure reduction and the subsequent pressure increase $\Delta p_K$ the control pressure $P_K$ envisaged for over-pressing the friction clutch is automatically reached again.

To determine the supply pressure $p_V$ from the control pressure $p_K$, the pressure increase $\Delta p_K$ and/or the pressure gradient $\Delta p_K/\Delta t$, calculation parameters are needed by means of which, for example, the influence of the geometry of the throttle cross-section of the briefly opened clutch control valve, or the influence of the viscosity of the pressure medium on the pressure increase $\Delta p_K$, and hence on the supply pressure $p_V$ calculated from it, can be taken into account. Expediently, at least one such calculation parameter for calculating the supply pressure $p_V$ from the sensor-determined pressure increase $\Delta p_K$ and/or the pressure gradient $\Delta p_K/\Delta t$ of the control pressure $p_K$ can be determined in the context of a teach-in process of the transmission control system, i.e. in the context of the first time the motor vehicle is operated at the vehicle manufacturer or when the motor vehicle is first operated again after a major repair in a servicing workshop. It is also conceivable for at least one such calculation parameter to be determined after each engine start.

As a practical application, the calculated supply pressure $p_V$ can be compared with at least one pressure threshold $p_{SW1}$, $p_{SW2}$, $p_{SW3}$ applicable to the transmission control system concerned, and depending on the level of the supply pressure $p_V$ relative to the pressure threshold $p_{SW1}$, $p_{SW2}$, $p_{SW3}$ at least one safety function can be implemented.

Alternatively however, in a similar practical application it can also be provided that from the calculated supply pressure $p_V$ a current leakage volume flow $Q_L$ is determined and the level of this leakage volume flow $Q_L$ is compared with at least one applicable leakage threshold $Q_{SW1}$, $Q_{SW2}$, $Q_{SW3}$, and depending on the level of the leakage volume flow $Q_L$ relative to the leakage threshold $Q_{SW1}$, $Q_{SW2}$, $Q_{SW3}$, i.e. if a maximum acceptable leakage is exceeded, at least one safety function is implemented.

Consequently, when the vehicle is at rest the engagement of a starting gear can be prevented if the supply pressure $p_V$ has reached or fallen below a medium pressure threshold $p_{SW2}$, or if the leakage volume flow $Q_L$ has reached or exceeded a medium leakage threshold $Q_{SW2}$.

Likewise, it can be provided that when the vehicle is at rest a starting process in progress is stopped and the gearshift transmission shifted to its neutral position if the supply pressure $p_V$ has reached or fallen below a lower pressure threshold, or if the leakage volume flow $Q_L$ has reached or exceeded an upper leakage threshold $Q_{SW3}$.

During driving, the gearshift transmission can be shifted to its neutral position if the supply pressure $p_V$ has reached or fallen below the medium pressure threshold $p_{SW2}$, or if the leakage volume flow $Q_L$ has reached or exceeded the middle leakage threshold $Q_{SW2}$.

Since, particularly with a friction clutch of passively engaging design, it is sometimes no longer certain that the friction clutch can be disengaged if the supply pressure $p_V$ is too low or the leakage volume flow $Q_L$ is too high, it is expediently provided that with the friction clutch engaged the gearshift transmission is shifted to its neutral position and, during the disengagement of the engaged gear the drive motor is kept free from torque by appropriately controlling the engine for this purpose.

To warn the driver, in addition it is expedient to emit an acoustic and/or visual warning signal, such as the sounding of a periodically interrupted warning note, the blinking of a warning light and/or the display of a corresponding error message by a display device, if the supply pressure $p_V$ has reached or fallen below an upper pressure threshold $p_{SW3}$, or if the leakage volume flow $Q_L$ has reached or exceeded a lower leakage threshold $Q_{SW3}$.

BRIEF DESCRIPTION OF THE DRAWINGS

To clarify the invention, the description of a drawing showing two example embodiments is attached.

The drawings show.

DETAILED DESCRIPTION OF THE PREFERRED EMBODIMENTS

Figure 1:
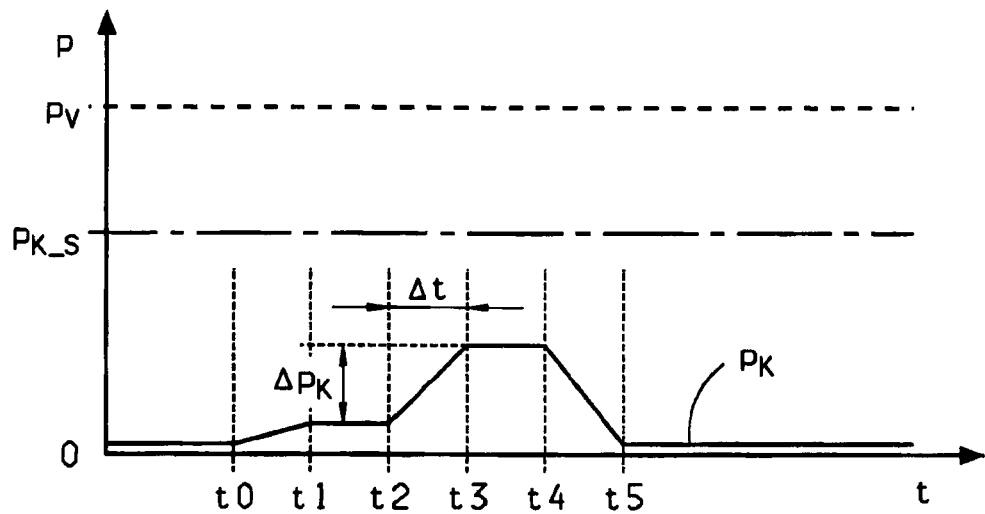
FIG. 1: Pressure variation of the control pressure during the determination of the supply pressure, in the case of a passively engaging friction clutch, in diagrammatic form.

The variation shown schematically in FIG. 1 for a passively engaging friction clutch such as a diaphragm spring clutch as known from DE 10 2006 014 141 A1, for the control pressure $p_K$ of an associated clutch control element, relates to the determination in accordance with the invention of the supply pressure $p_V$ of the pressure supply unit of a hydraulic or pneumatic transmission control system during driving operation with the friction clutch fully engaged, i.e. with the clutch control element largely depressurized.

Between times t0 and t1 the clutch control element is pre-filled, which increases the accuracy of the subsequently determined supply pressure $P_V$. For this, the associated clutch control valve is opened briefly toward the supply line of the pressure supply unit. From time t2 the clutch control valve is again opened toward the supply line, with a defined throttle cross-section for a time interval t. During this, by means of a pressure sensor connected to the pressure space of the clutch control element the control pressure $p_K$ existing at time t2, the pressure increase $\Delta p_K$ produced in the pressure space during the interval $\Delta t$, and if necessary the pressure gradient $\Delta p_K/\Delta t$ registered during the same interval are determined, and from these the supply pressure $p_V$ in the supply line is calculated with the help of calculation parameters determined analytically and/or experimentally.

Then, between times t4 and t5 the clutch control element is depressurized by connecting its pressure space to an unpressurized line leading to an oil sump, and the friction clutch is thus again fully engaged, with corresponding over-pressure. Since the level of the control pressure $p_K$ increased by the pre-filling and the subsequent pressure rise $\Delta p_K$ for the determination of the supply pressure $p_V$ is still far lower than the slip limit $P_{K\_S}$ of the friction clutch, the friction clutch does not slip, so driving operation is not affected by the process sequence.

Figure 2:
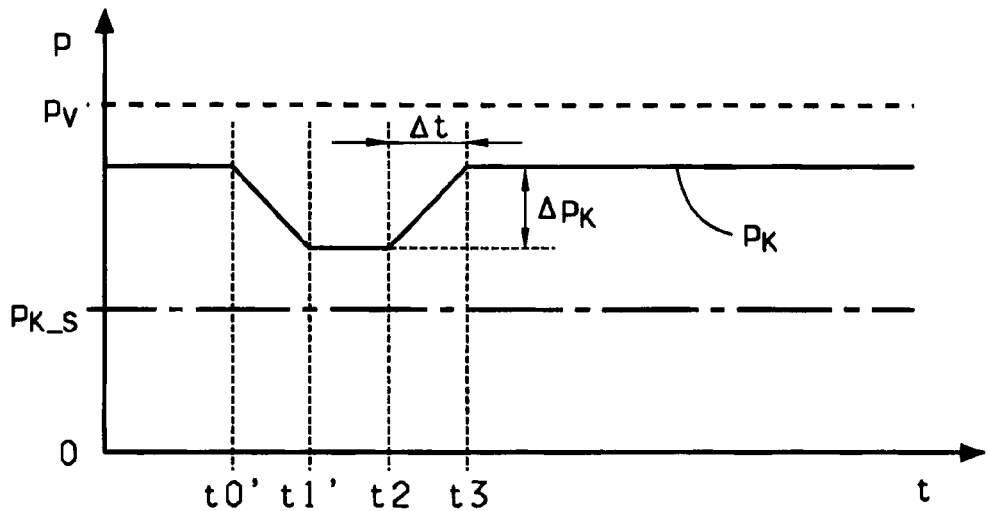
FIG. 2: Pressure variation of the control pressure during the determination of the supply pressure, in the case of an actively engaging friction clutch, in diagrammatic form.

The variation of the control pressure $p_K$ of an associated clutch control element for an actively engaging friction clutch such as a disk clutch, illustrated schematically in FIG. 2, also relates to the determination in accordance with the invention of the supply pressure $p_V$ of the pressure supply unit of a hydraulic or pneumatic transmission control system during driving operation with the friction clutch fully engaged, which in this case corresponds to a clutch control element pressurized to its maximum control pressure $p_K$.

Between times t0' and t1' the control pressure $p_K$ in the pressure space of the clutch control element is first reduced by a brief connection to an unpressurized line leading to a pressure medium sink. In a hydraulic control system, for example, the oil sump can serve as the pressure medium sink, whereas in a pneumatic control system the exhaust air can be discharged to the surroundings via the unpressurized line. Then, between times t2 and t3 the associated clutch control valve is opened toward the supply line, with a defined throttle cross-section for the time interval $\Delta t$. During this the control pressure $p_K$ existing at time t2, the pressure increase $\Delta p_K$ produced in the pressure space during the time interval $\Delta t$, and if necessary the pressure gradient $\Delta p_K/\Delta t$ registered during the same interval are determined by a pressure sensor connected to the pressure space of the clutch control element, and then the supply pressure $p_V$ in the supply line is calculated from these with the help of analytically and/or experimentally determined calculation parameters.

The degree of the prior pressure reduction is chosen to be approximately equal to the pressure increase $\Delta p_K$ produced for the determination of the supply pressure $p_V$, so that without further measures, at time t3 the friction clutch is again fully engaged with a corresponding over-pressure. Since the level of the control pressure $p_K$ reduced by the pressure reduction is still far above the slip limit $p_{K\_S}$ of the friction clutch, the friction clutch does not slip, so that in this case too driving operation is not affected by the process sequence.

INDEXES $p_K$ Control pressure
$p_{K\_S}$ Slip limit
$p_Q$ Source pressure
$p_S$ Control pressure
$p_{SW1}$ Lower pressure threshold
$p_{SW2}$ Medium pressure threshold
$p_{SW3}$ Upper pressure threshold
$p_V$ Supply pressure
$Q_L$ Leakage volume flow
$Q_{SW1}$ Lower leakage threshold
$Q_{SW2}$ Medium leakage threshold
$Q_{SW3}$ Upper leakage threshold
t0-t5 Time points
t0'-t1' Time points
$\Delta_P$ Pressure difference
$\Delta_{PK}$ Pressure increase
$\Delta_{PS}$ Pressure increase
$\Delta t$ Time interval

The invention claimed is:

1. A method of monitoring either a hydraulic or a pneumatic transmission control system comprising a pressure supply unit with a supply line carrying a pressure medium under a supply pressure ($p_V$), and having an actuating member for a clutch control element of a friction clutch such that the actuating member has a pressure space that is connectable, via a clutch control valve, to the supply line, and in which the supply pressure ($p_V$) is determined by a pressure sensor that is connectable to the supply line by a control valve, the method comprising the steps of:

determining the supply pressure ($p_V$) via the pressure sensor connected to the pressure space of the clutch control element by virtue of the fact that by briefly opening the clutch control valve, producing at least one of a pressure increase ($\Delta p_K$) and a pressure gradient ($\Delta p_K/\Delta t$) of a control pressure ($p_K$) in the pressure space of the clutch control element, calculating the supply pressure ($p_V$) currently present from the control pressure ($p_K$), and determining at least one of the pressure increase ($\Delta p_K$) and the pressure gradient ($\Delta p_K/\Delta t$) via the pressure sensor.

2. The method according to claim 1, further comprising the step of producing a pressure reduction ($\Delta_K$) of the control pressure ($p_K$) at a time either shortly before or shortly after the clutch control valve is opened to determine the supply pressure ($p_V$) by briefly connecting the pressure space of the clutch control element to an unpressurized line, and the pressure reduction ($\Delta p_K$) of the control pressure ($p_K$) is approximately the same as that of the pressure increase ($\Delta p_K$) of the control pressure ($p_K$) produced by opening the clutch control valve.

3. The method according to claim 1, further comprising the step of determining the supply pressure ($p_V$) at a start of a disengagement of the friction clutch related to either a starting or a shift process, after pre-filling the clutch control element, when the friction clutch is a passively engaging friction clutch.

4. The method according to claim 1, further comprising the step of determining the supply pressure ($p_V$) during a driving operation in operating phases when the friction clutch is fully engaged after prior pre-filling, and the clutch control element is subsequently depressurized, when the friction clutch is a passively engaging friction clutch.

5. The method according to claim 1, further comprising the step of determining the supply pressure ($p_V$) at an end of an engagement of the friction clutch related to either a starting or a shift process, before reaching a maximum clutch control element pressure envisaged, when the friction clutch is an actively engaging friction clutch.

6. The method according to claim 1, further comprising the step of determining the supply pressure ($p_V$), during a driving operation, in operating phases with the friction clutch fully engaged after a prior reduction of the pressure in the clutch control element, when the friction clutch is an actively engaging friction clutch.

7. The method according to claim 1, further comprising the step of determining during a teach-in process of the transmission control system at least one calculation parameter for calculating the supply pressure ($p_V$) from at least one of the pressure increase ($\Delta p_K$) of the control pressure ($p_K$) sensed via the pressure sensor and the pressure gradient ($\Delta p_K/\Delta t$) of the control pressure ($p_K$).

8. The method according to claim 1, further comprising the step of comparing the supply pressure ($p_V$) calculated from the currently present control pressure ($p_K$) with at least one applicable pressure threshold ($p_{SW1}$, $p_{SW2}$, $p_{SW3}$) and implementing at least one safety function depending on a level of the supply pressure ($p_V$), calculated from the currently present control pressure ($p_K$), relative to the pressure threshold ($p_{SW1}$, $p_{SW2}$, $P_{SW3}$).

9. The method according to claim 1, further comprising the step of determining a current leakage volume flow ($Q_L$) from the supply pressure ($p_V$), calculated from the currently present control pressure ($p_K$), and comparing an amount of the leakage volume flow ($Q_L$) with at least one applicable leakage threshold ($Q_{SW1}$, $Q_{SW2}$, $Q_{SW3}$), and implementing at least one safety function depending on the amount of the leakage volume flow ($Q_L$) relative to the applicable leakage threshold ($Q_{SW1}$, $Q_{SW2}$, $Q_{SW3}$).

10. The method according to claim 8, further comprising the step of, when a vehicle containing the transmission is at rest and if either the supply pressure ($p_V$) has either reached or fallen below a medium pressure threshold ($p_{SW2}$) or the leakage volume flow ($Q_L$) has either reached or exceeded a medium leakage threshold ($Q_{SW2}$), preventing engagement of a starting gear.

11. The method according to claim 8, further comprising the step of, if the supply pressure ($p_V$) has either reached or fallen below a lower pressure threshold ($0p_{SW1}$) or the leakage volume flow ($Q_L$) has either reached or exceeded an upper leakage threshold ($Q_{SW3}$), discontinuing a starting process that is in progress while a vehicle containing the transmission is at rest and shifting the transmission to a neutral position.

12. The method according to claim 8, further comprising the step of, if either the supply pressure ($p_V$) has either reached or fallen below a medium pressure threshold ($p_{SW2}$) or the leakage volume flow ($Q_L$) has either reached or exceeded a medium leakage threshold ($Q_{SW2}$), shifting the transmission to a neutral position during driving.

13. The method according to claim 11, further comprising the step of shifting the transmission to a neutral position, with the friction clutch engaged and during disengagement of an engaged gear, and keeping a drive motor free from torque by appropriately controlling the drive motor.

14. The method according to claim 8, further comprising the step of, if either the supply pressure ($p_V$) has either reached or fallen below an upper pressure threshold ($p_{SW3}$) or the leakage volume flow ($Q_L$) has either reached or exceeded a lower leakage threshold ($Q_{SW1}$), emitting at least one of an acoustic and a visual warning signal to warn a driver.

15. A method of monitoring either a hydraulic or a pneumatic transmission control system comprising a pressure supply unit with a supply line carrying a pressure medium under a supply pressure ($p_V$), and having an actuating member for a clutch control element of a friction clutch, such that the actuating member has a pressure space that is connectable, via a clutch control valve, to the supply line, and in which the supply pressure ($p_V$) is determined by means of a pressure sensor that is connectable to the supply line by a control valve, the method comprising the steps of:

connecting the pressure sensor to the pressure space of the clutch control element to determine the supply pressure ($p_V$);

producing at least one of a pressure increase ($\Delta p_K$) and a pressure gradient ($\Delta p_K/\Delta t$) of the control pressure ($p_K$) in the pressure space of the clutch control element by briefly opening the clutch control valve; and calculating a current present supply pressure ($p_V$) from the control pressure ($p_K$) and at least one of the pressure increase ($\Delta p_K$) and the pressure gradient ($\Delta p_K/\Delta t$) determined by the pressure sensor.

* * * * *